United States Patent [19]

Jacquemart

[11] 4,283,238

[45] Aug. 11, 1981

[54] METHOD OF RECONSTITUTING THE EXTERNAL CONDUCTOR OF A COAXIAL CABLE AND CABLE THUS RECONSTITUTED

[75] Inventor: Patrick Jacquemart, Calais, France

[73] Assignee: Les Cables de Lyon, Lyons, France

[21] Appl. No.: 912,148

[22] Filed: Jun. 2, 1978

[30] Foreign Application Priority Data

Jun. 28, 1977 [FR] France .................................. 77 19743

[51] Int. Cl.³ .......................... H02G 1/14; B21F 15/06
[52] U.S. Cl. .................................... 156/49; 29/402.01;
29/868; 156/53; 156/55; 156/56; 156/94;
156/188; 156/195; 156/330; 156/332; 174/109;
428/388; 428/406
[58] Field of Search ................. 29/630 F, 868, 402.01;
156/49, 53, 55, 56, 94, 188, 195, 330, 332;
252/500, 511, 514; 260/37 M, 42.14, 42.18;
428/406, 388; 174/108, 109

[56] References Cited

U.S. PATENT DOCUMENTS

| 2,936,258 | 5/1960 | Benton | 156/56 |
|---|---|---|---|
| 3,332,813 | 7/1967 | Clarke | 156/49 |
| 3,404,050 | 10/1968 | Gill | 156/56 X |
| 3,580,756 | 5/1971 | Kashara et al. | 156/49 |
| 3,876,559 | 4/1975 | Jaffe | 252/512 |
| 3,921,378 | 11/1975 | Spicer et al. | 174/109 X |
| 4,051,324 | 9/1977 | Anderson et al. | 156/56 X |
| 4,187,391 | 2/1980 | Voser | 156/56 X |

FOREIGN PATENT DOCUMENTS

| 2220901 | 10/1974 | France . |
| 410213 | 5/1934 | United Kingdom . |
| 433864 | 8/1935 | United Kingdom . |
| 472063 | 9/1937 | United Kingdom . |

Primary Examiner—David A. Simmons
Assistant Examiner—Robert A. Dawson
Attorney, Agent, or Firm—Sughrue, Mion, Zinn, Macpeak and Seas

[57] ABSTRACT

A method of reconstituting an external conductor of a coaxial cable which stands up well to bending and has good electromagnetic propagation. Solid non-perforated or woven strips are wound in a helix along the whole length of the part which is to be repaired and the ends of the intact external conductor and said strips are glued on these ends with an electrically conductive glue. Application to coaxial telephone cables.

3 Claims, 5 Drawing Figures

METHOD OF RECONSTITUTING THE EXTERNAL CONDUCTOR OF A COAXIAL CABLE AND CABLE THUS RECONSTITUTED

FIELD OF THE INVENTION

The present invention relates to the reconstitution of an aluminum outer conductor of a coaxial telecommunications cable when repairing such a cable.

BACKGROUND OF THE INVENTION

A known coaxial telecommunications cable is constituted by a central conductor, a dielectric core which is extruded and trued, a metal tube tightly embracing the core and forming the outer conductor and an outer sheath made of a plastics material on the outer conductor. Such a cable is repaired in four operations:
connection of the central conductor;
moulding of the dielectric;
reconstitution of the outer conductor; and
reconstitution of the outer sheath.

The invention relates to the third operation.

Up to now, the aluminium outer conductor has been reconstituted as follows: a metal strip of suitable size is formed round the insulator on a bare portion of outer conductor with a gap of a few millimeters at each end.

Electric continuity is provided by strips wound in a helix overlapping each of the two discontinuities and spot welded at each of their ends firstly to the added metal strip and secondly to the conductor of the cable. The strips are spot welded either cold by crushing and raising the external conductor, or with an electric arc. Such reconstitution gives full satisfaction from the electrical point of view. However, from the mechanical point of view, the method in accordance with the prior art has a number of disadvantages. In particular, spot welding is impossible in the case of outer conductors which are originally glued to the core when they are applied thereto. Indeed, cold welding is not possible because the outer conductor cannot be raised; hot welding is also impossible because the molten metal is polluted by the molten surface of the polyethylene. Further, mechanical resistance to bending is poor. Lastly, in the case of a connection between cables of different sizes, the reconstitution of the outer conductor is not possible, without major preparation, on the diameter-transition portion of insulator.

Preferred application of the present invention remedy these various disadvantages. Indeed, the external conductor can be reconstituted simply while still providing high mechanical resistance to bending.

SUMMARY OF THE INVENTION

The present invention provides a method of reconstituting an aluminium outer conductor of a coaxial cable which includes a portion of bared dielectric between two ends of outer conductor which ends are to be mechanically and electrically connected together. The said method includes a first step of winding at least one conductive tape in a helix to cover said bared dielectric and the two ends of the outer conductor, and a second step of sticking the ends of the conductive tape to the outer conductor by means of an electrically conductive adhesive.

The present invention also provides a coaxial cable reconstituted by the above method.

An example of an application of the present invention will be described by way of an illustration having no limiting character with reference to the accompanying drawings.

BRIEF DESCRIPTION OF THE DRAWINGS

The same parts shown in several of these figures bear the same reference symbols in all of them.

DESCRIPTION OF PREFERRED EMBODIMENTS

Figure 1:
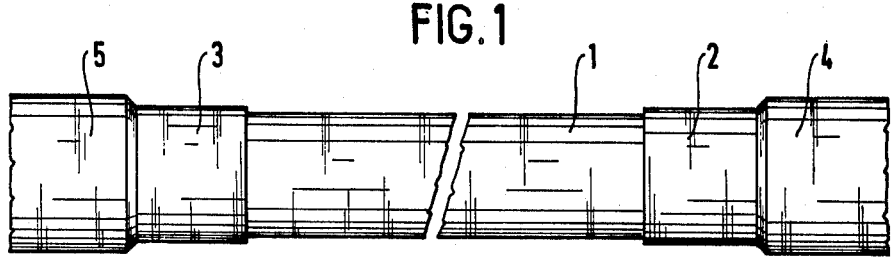
FIG. 1 is a side elevational view of a coaxial cable without an outer conductor over its middle portion.
Figure 2:
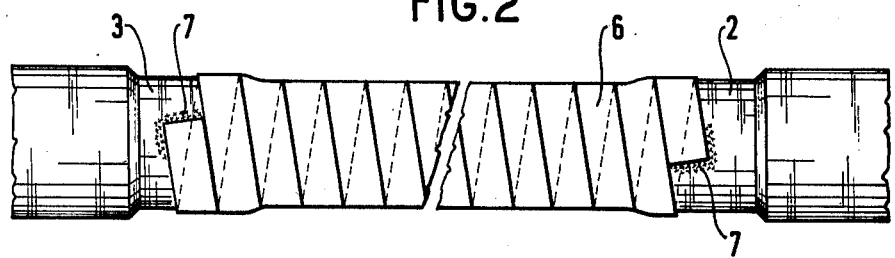
FIG. 2 is a similar side elevational view which shows one method of reconstituting said middle portion in accordance with the present invention (single non-perforated tape)

FIG. 1 shows a coaxial cable whose inner dielectric 1 is bared between two ends 2 and 3 of aluminium outer conductor, which ends are also bared. References 4 and 5 each refer to an outer sheath of the coaxial cable which covers the outer conductor. FIG. 2 shows a non-perforated tape 6 made of a metal conductor such as aluminum which is wound in a helix and covers the whole part to be repaired and is disposed over the dielectric 1 and a part of the ends 2 and 3 of the outer conductor. The tape 6 is made integral with the ends 2 and 3 by adhesive 7. The adhesive 7 is one which dries rapidly such as an epoxy or polyester resin and it is mixed with grains of silver-coated glass so as to make it electrically conductive. The function of the adhesive is to allow mechanical and electrical connection of the tape 6 to the outer conductors 2 and 3.

Figure 3:
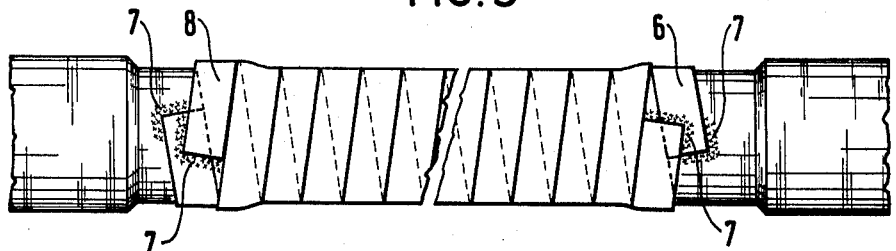
FIG. 3 is a side elevational view which shows a variant method of reconstitution (two crossed tapes)

FIG. 3 shows two tapes 6 and 8, the first being identical to that of FIG. 2 and the second being wound in a helix over the first with a reverse pitch so as to cross the layers. For example, the tape 6 is stuck to the ends of the tape 6 with the adhesive 7.

Figure 4:
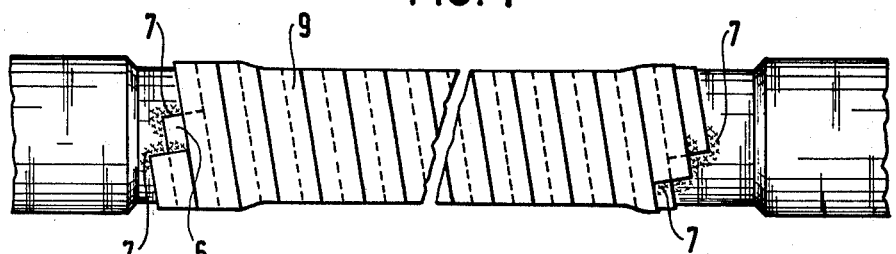
FIG. 4 is a side elevational view which shows another variant method of reconstitution (two superposed tapes)

FIG. 4 shows two tapes 6 and 9 wound in a helix with the same pitch but with the tape 9 covering the edge of the tape 6. The ends of the tapes 6 and 9 are stuck with the adhesive 7 to the ends of the outer conductor.

Figure 5:
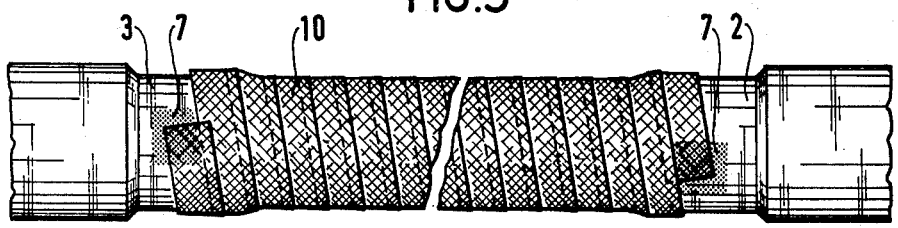
FIG. 5 is a side elevational view which shows the preferred variant method of reconstitution (using an aluminium gauze tape).

FIG. 5 shows a tape 10 made of aluminium gauze wound in a helix with successive layers partially overlapping. The adhesive 7 is impregnated through the ends of the tape 10 on the ends 2 and 3 of the outer conductor.

In the drawing, the differences in level of the tapes at the outer conductors have been greatly exaggerated. The tapes disposed on the part to be repaired do not disturb electromagnetic propagation and echometer tests have proved that the repair is hardly detectable and therefore has the required electrical quality. Such a reconstitution of the outer conductor of the coaxial cables is particularly suitable when aluminium gauze tapes are used for the case of transitions in diameter.

Applications come within the field of coaxial telephone cables, in particular sub-marine cables with an aluminium return conductor.

What is claimed is:

1. A method of repairing an aluminum outer conductor of a coaxial cable which includes a portion of bared dielectric between two ends of said outer conductor which ends are to be mechanically and electrically connected together, said method of repairing said cable producing a crack resistant mend at said portion of bared dielectric, said mend further having a low impedance, said method comprising (i) winding at least one conductive tape made of aluminum gauze in a helix, the edges of successive turns of said tape overlapping to cover said bared dielectric and said ends of said outer conductor; and (ii) sticking the ends of said conductive tape to the outer conductor by means of an electrically conductive adhesive selected from the group consisting of epoxy and polyester resins having conductive particles added thereto.

2. A method of repairing an aluminum outer conductor of a coaxial cable which includes a portion of bared dielectric between two ends of said outer conductor which ends are to be mechanically and electrically connected together, said method of repairing said cable producing a crack resistant mend at said portion of bared dielectric, said mend further having a low impedance, said method comprising (i) winding a first non-perforated conductive tape in a helix in one direction, and a second non-perforated conductive tape in a helix in a direction opposite said one direction to cover said bared dielectric and said ends of said outer conductor; and (ii) sticking the ends of said first and second non-perforated conductive tapes to the outer conductor by means of an electrically conductive adhesive selected from the group consisting of epoxy and polyester resins having conductive particles added thereto.

3. A method of repairing an aluminum outer conductor of a coaxial cable which includes a portion of bared dielectric between two ends of said outer conductor which ends are to be mechanically and electrically connected together, said method of repairing said cable producing a crack resistant mend at said portion of bared dielectric, said mend further having a low impedance, said method comprising (i) winding first and second non-perforated conductive tapes in helixes having the same direction and helical pitch to cover said bared dielectric and the two other ends of the outer conductor, said second tape covering the edges of said first tape; and (ii) sticking the ends of said first and second non-perforated conductive tapes to the outer conductor by means of an electrically conductive adhesive selected from the group consisting of epoxy and polyester resins having conductive particles added thereto.

* * * * *